Feb. 6, 1934.  R. L. MYERS  1,945,949
TUBE CUTTER
Filed May 21, 1932  2 Sheets-Sheet 1
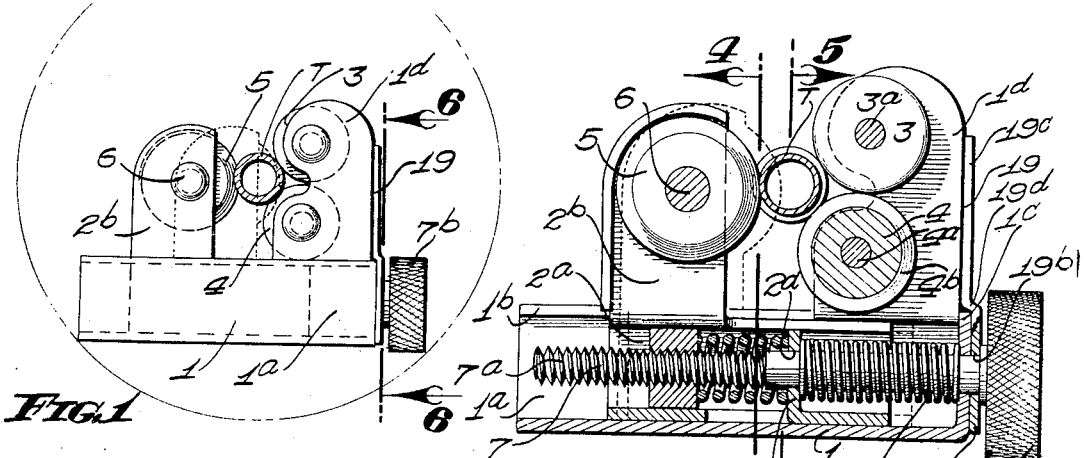
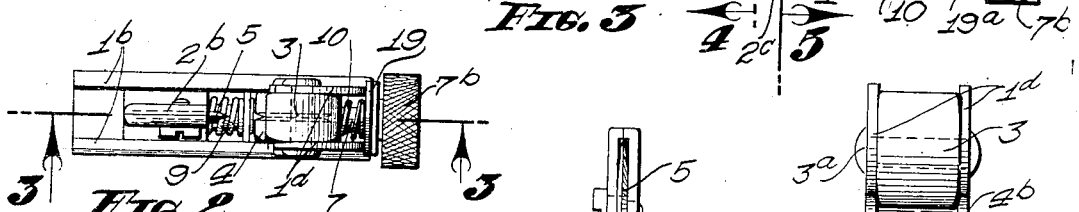
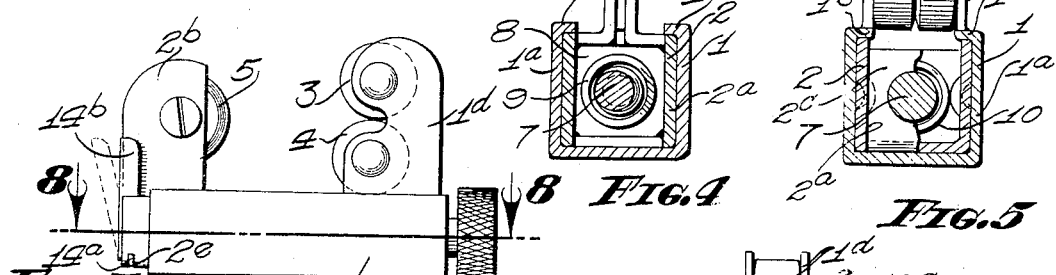
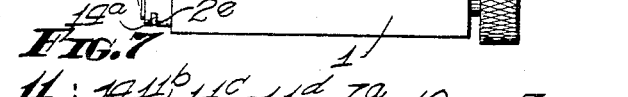
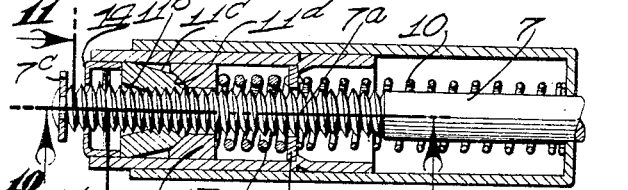
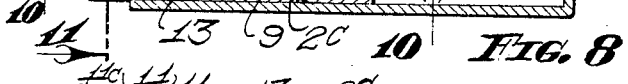
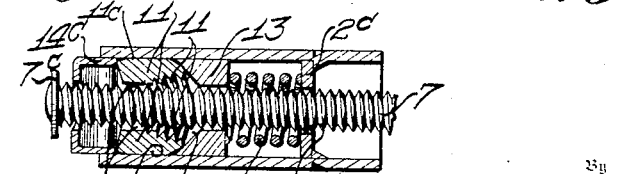
Inventor
ROBERT L. MYERS
By A. B. Bowma
Attorney

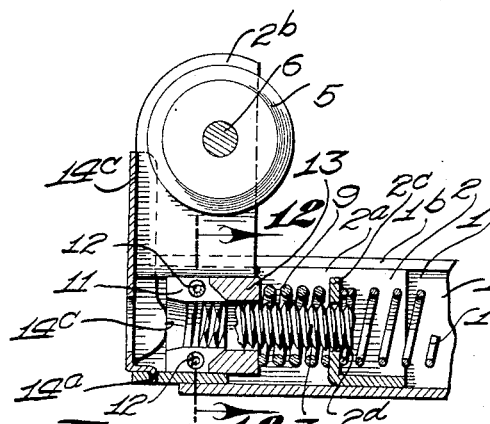

Patented Feb. 6, 1934

1,945,949

UNITED STATES PATENT OFFICE 1,945,949

TUBE CUTTER

Robert L. Myers, San Diego, Calif.

Application May 21, 1932. Serial No. 612,750

13 Claims. (Cl. 81—189)

My invention relates to tube cutters, and the objects of my invention are:

First, to provide a cutter which is particularly adapted for severing copper, brass, or other tubing of relatively soft material;

Second, to provide a tube cutter which is adapted to turn in an extremely small radius so that it may be used to cut tubes which are located in awkward places thereby providing a tube cutter which is particularly useful when restoring or repairing refrigerating plants or units or other apparatus in which tubes may be ranged in a coil or otherwise placed in proximity to each other;

Third, to provide a tube cutter of this class which eliminates the need of using a hack saw for cutting awkwardly positioned tubes, thereby eliminating the attendant sawdust inasmuch as the tube cutter does not produce any waste or deleterious particles when severing a tube;

Fourth, to provide a tube cutter of this class which is capable of operating extremely close to the end of a tube so that very small portions may be cut therefrom, if desired;

Fifth, to provide a tube cutter of this class which may be used to cut extremely small tubing;

Sixth, to provide a tube cutter of this class in which the cutting wheel is automatically fed into the tube as it cuts, thereby providing a tube cutter which may be easily and quickly positioned for use and which requires mere turning of the cutter in order to complete the operation once the cutter has been positioned;

Seventh, to provide a tube cutter which incorporates a quick adjusting means without increasing the radius in which the tube cutter is adapted to turn, and Eighth, to provide on the whole a novelly constructed tube cutter which is particularly compact, yet extremely durable of construction, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of one embodiment of my tube cutter, showing the parts in position for cutting a tube; Fig. 2 is a top or plan view thereof; Fig. 3 is an enlarged sectional view thereof through 3—3 of Fig. 2, with parts and portions shown in elevation to facilitate the illustration; Figs. 4 and 5 are enlarged transverse sectional views through 4—4 and 5—5, respectively, of Fig. 3, with parts and portions shown in elevation; Fig. 6 is a sectional view through 6—6 of Fig. 1 showing the burr remover in its extended position; Fig. 7 is a side elevational view of a second embodiment of my invention which incorporates a quick adjusting means; Fig. 8 is an enlarged sectional view through 8—8 of Fig. 7, showing the quick adjusting means in position for operation by the adjusting screw; Fig. 9 is a similar sectional view showing the quick adjusting means disengaged from the adjusting screw so as to be shifted relative thereto; Fig. 10 is a sectional view through 10—10 of Fig. 8, with parts and portions broken away and removed, or shown in elevation, to facilitate the illustration; Fig. 11 is a transverse sectional view through 11—11 of Fig. 8, with parts and portions shown in elevation; Fig. 12 is a transverse sectional view through 12—12 of Fig. 10; Fig. 13 is an enlarged longitudinal sectional view of a third embodiment of my invention showing a second form of quick adjusting means; Fig. 14 is a longitudinal sectional view of the slide member and cutting wheel support, showing the cutting wheel support in its tilted position; Fig. 15 is a transverse sectional view through 15—15 of Fig. 13, and Fig. 16 is an elevational view taken from the line 16—16 of Fig. 13 with the adjusting screw omitted.

Similar characters of reference refer to similar parts and portions throughout the several views of the drawings.

Body member 1, slide member 2, rollers 3 and 4, cutting wheel 5, journal pin 6, adjusting screw 7, traveler member 8, cutter feeding or advancing spring 9, return spring 10, dog clutch members 11, springs 12, cone collar 13, clutch setting lever 14, slide member 15, pin 16, cutting wheel support 17, adjusting screw 18, and burr remover 19, constitute the principal parts and portions of my novel tube cutter.

Reference is particularly called to Figs. 1 to 6, inclusive, in which the simplified form of my tube cutter is illustrated. A body member 1 is provided which comprises a channel portion 1a the side walls of which are at right angles to the bottom thereof. The upper extremities of the side walls forming the channel 1a are provided with inturned guide flanges 1b which extend the length of the channel portion. One end of the channel portion 1a is closed by an upturned end piece 1c. Adjacent this end the flanges 1b are provided with upwardly directed arms 1d which are offset inwardly a slight distance with respect to the side walls of the channel.

The arms 1d are provided with pins 3a and 4a which extend therebetween and support rollers 3 and 4, respectively. The rollers are ranged one above the other with the lower roller offset rearwardly or away from the end piece or end wall 1c with respect to the outer roller 3. The inner roller 4 is provided with a centrally disposed annular groove 4b.

The channel portion 1a and inturned flanges 1b form a guide for a slide member 2. The slide member 2 also includes a channel-shaped portion 2a which fits snugly in the channel portion 1a of the body member, as shown best in Figs. 3, 4 and 5. At its rearward portion, that is the portion remote from the end wall 1c, the slide member is provided with a pair of inwardly offset upwardly extending arms 2b which are spaced just far enough apart to receive a relatively thin cutting wheel 5. The arms 2b enclose the cutting wheel except for its forward portion which faces the rollers 3 and 4. The cutting wheel is revolubly mounted on a journal pin 6 which may be in the form of a set screw so that the wheel may be removed when it becomes worn. The cutting wheel 5 is so positioned that it passes into the groove 4b before engaging the roller 3. It is not intended that the cutting wheel should engage the rollers. For this reason the slide member 2 is made long enough to cause its forward end to engage the end piece or end wall 1c when the cutting wheel is in close proximity to the rollers. By reason of the relative position of the rollers and the groove 4b in the inner roller, it is possible to adjust the cutter so as to act upon tubes of very small diameter.

The slide member 2 is provided in its channel portion 2a with a partition 2c which may be formed by bending a portion of the bottom of the channel upwardly, as shown in Figs. 3 and 5. The partition 2c and end piece 1c are provided with alined openings 2d and 1e which are adapted to receive and journal an adjusting screw 7. The rearward end of the adjusting screw which extends through the partition 2c is provided with screw threads 7a. The other extremity of the adjusting screw which projects through the end wall 1c is provided with a knurled turning wheel 7b. A traveler member 8 which may be in the form of a nut is screwed upon the threaded portion 7a and is arranged to fit snugly within the slide member so as to shift axially therein but be restrained against turning relative thereto. Between the traveler member and partition 2c there is provided a cutter feeding or advancing spring 9. Between the partition 2c and the end wall 1c there is provided a return spring 10. The spring 9 is made considerably stronger than the spring 10 so that there is practically no compression of the spring 9 when the slide member is adjusted back and forth without engaging an obstruction.

Operation of the above-described structure is as follows: The tube to be severed is positioned so as to bear against the rollers 3 and 4. The adjusting screw 7 is turned so as to draw the cutting wheel 5 towards the tube. During this first movement before the tube is engaged the spring 10 compresses while the spring 9 moves bodily without appreciable compression. However, when the slide member is limited against further movement by reason of the cutting wheel engaging the tube, further turning of the adjusting screw compresses the spring 9. When sufficient tension has been applied to the cutter is turned bodily around the tube T. As the cutter turns the tension supplied by the spring 9 causes the cutter wheel to advance into the tube and finally sever it. The cutter wheel moves by action of the spring 9 from the solid to the dotted line position shown in Fig. 3. When the cutting operation has been completed the adjusting screw is turned in the reverse direction, whereupon the return spring 10 causes the slide to follow the traveler member 8.

In the structure illustrated in Figs. 7 to 12, inclusive, there is provided a quick adjusting means which enables the cutting wheel to be moved quickly to and from the tube to be severed. This embodiment of my tube cutter is in most respects the same as the first described structure in that the body member 1, slide member 2, rollers 3 and 4, cutting wheel 5, adjusting screw 7, and springs 9 and 10 remain the same, except that a transverse slit 2e is formed in the channel portion 2a at the bottom thereof adjacent the rear extremity of the slide member, and a stop 7c is provided at the rearward extremity of the adjusting screw.

In place of the traveler member 8 there is provided a pair of dog clutch members 11 which are complementary and which are provided at their adjacent or inner sides with corresponding fragmentary screw threads 11a. The screw threaded portions 11a extend rearwardly about half the length of the dog clutch members at which point the inner peripheries of the dog members are beveled, as indicated by 11b, so that the threaded portions 11a may be rotated clear of the adjusting screw 7. The extent of this movement is limited by corresponding beveled portions 11c formed at the outer sides of the clutch dog members. The outer beveled portions 11c converge toward the forward ends of the clutch dog members. These members are substantially rectangular in cross section so that they fit snugly within the slide member 2 and are held thereby against turning. The outer beveled portions 11c axially overlap the beveled portions 11b. Small springs 12 are positioned between the dog members and extend into corresponding sockets provided therein, as shown best in Figs. 10 and 12. The location of the springs are such that they tend to force the forward extremities of the clutch dog members apart, that is, to the position shown in Fig. 9.

The forward extremities of the clutch dog members are made conical, as indicated by 11d, and are adapted to fit into a conical recess 13a formed in the rear side of a collar 13 which is slidable upon the adjusting screw. Thus, when the dog members are forced towards the collar they are shifted from the position shown in Fig. 9 to the position shown in Fig. 8. The spring 9 is positioned between the collar 13 and the partition 2c.

A clutch setting lever 14 is provided which comprises an offset lower end portion 14a adapted to fit in the slot 2e formed in the slide member 2, as shown best in Figs. 10 and 11. The lever is capable of limited pivotal movement with respect to the slot 2e and extends upwardly therefrom across the rear extremity of the channel 2a and along the rear margins of the arms 2b. The major portion of the lever 14 is substantially channel-shaped forming forwardly extending ribs 14b. The ribs 14b extend within the channel portion 2a and form lugs 14c at their lower portions which are adapted to engage the rear extremities of the clutch dog members, it being here noted that the dog clutch members are positioned in horizontal relation with each other on opposite sides of the adjusting screw. The lugs 14c force the dog clutch members 11 into the collar 13 upon forward movement of the lever, the spring 9 being stiff enough to retain the collar member 13 in position during this movement. By properly determining the size of the spring 9 little or no compression of this spring is required to shift the dog clutch members from their disengaged to their engaged position.

Operation of the second embodiment of my tube cutter is as follows: With the lever 14 in the dotted line position shown in Fig. 7, which is also the released position of the clutch illustrated in Fig. 9, the slide and cutter wheel are shifted along the adjusting screw until the cutting wheel is in contact with the tube. Whereupon the setting lever 14 is moved to the solid line position causing the clutch to engage the adjusting screw so as to be shifted backward or forward thereby, in the same manner as in the first described structure.

The third embodiment of my invention, illustrated in Figs. 13 to 16, inclusive, includes a second form of quick adjusting means. In this structure the body member is the same as in the other two structures, except that the end wall 1c may be offset inwardly with respect to the forward end of the body element, as shown in Fig. 13. In place of the slide member 2 there is provided a slide member 15 which is channel-shaped and arranged to fit snugly within the channel portion 1a of the body member. Near its upper margin and slightly rearwardly of its central portion, the slide member 15 is provided with a transversely extending pin 16 which journals a cutting wheel support 17, said support being journalled at its lower forward corner. Above the pin 16 the support is reduced in width and bifurcated forming a slot 17a in which is mounted the cutting wheel 5 and journal pin 6. The lower end of the support 17 is grooved longitudinally with respect to the slide member 15 and is provided with partial or fragmentary screw threads 17b at the portion of the groove rearwardly of the pin 16.

The slide 15 is provided with a partition 15a which is disposed immediately forwardly of the support 17. The partition 15a is provided with an aperture 15b which is in alinement with the aperture 1e in the end wall 1c. The apertures 15b and 1e journal the shank portion of an adjusting screw 18. The adjusting screw is provided with a threaded portion which is adapted to be engaged by the partial threads 17b. In order to hold the adjusting screw in proper relation to the threads 17b the slide member 15 is provided with a boss 15c which is pressed upwardly from the bottom thereof, as shown best in Figs. 13 and 15. This enables considerable strain to be placed upon the adjusting screw without causing it to bind at the partition 15a.

The forward end of the adjusting screw is provided with a turning wheel 18b which is provided with a recess 18c at its inner side. The spring 9 is positioned between the turning wheel 18b and the partition 1c, as shown in Fig. 13. The return spring 10 is positioned between the partition 15a and the end wall 1c. A suitable pin 18d or other means is provided in the adjusting screw for limiting outward movement thereof.

Operation of this form of my tube cutter is as follows: When the support 17 is tilted to the dotted line position shown in Fig. 13, that is the solid line position shown in Fig. 14, the slide, support, and cutting wheel are free to shift back and forth upon the adjusting screw. When approximately the desired position is obtained, the support 17 is tilted backwardly until the fragmentary screw threads 17b engage the adjusting screw. Whereupon the adjusting screw may be turned to obtain the desired adjustment and tension of the spring 9.

After the cutting operation a rudimentary inwardly extending flange or burr is formed in the pipe caused by the pressure exerted by the cutting wheel. This burr is preferably left in place when the end of the pipe is to be flared as the burr tends to strengthen the flared end. However, if the pipe end is to be belled to telescopically receive another pipe or is to retain its normal diameter, it is desirable to remove the burr. This is accomplished by a burr remover 19 which is rotatably mounted upon the shaft 7 between the head 7b and the end wall 1c of the body member 1.

The burr remover comprises a rectangular portion 19a substantially coextensive with the end wall 1c and having a centered opening 19b. A pointed projection 19c forming cutting edges along its margins extends from one side of the rectangular portion, being joined thereto through a shoulder 19d. The shoulder 19d overlaps the margins of the end wall 1c so that the burr remover cannot be rotated without the shoulder overriding the corners of the end wall and causing a slight axial movement of the adjusting screw 7 against the tension of the spring 10. Thus, the burr remover is yieldably held in the out-of-the-way position shown in Figs. 1, 2 and 3 or in the extended or operative positions shown in Fig. 6. The burr remover is operated by thrusting the projection 19c into the end of a tube and turning, using the body member 1 as a handle.

Though I have shown and described a particular embodiment of my invention, and certain modifications thereof, I do not wish to be limited to this embodiment, nor to the modification, but desire to include in the scope of my invention the construction, combination and arrangement substantially as set forth in the appended claims.

Having thus described my invention, what I claim as new and desire to secure by Letters Patent is:

1. In a tube cutter, a body element, a slide member carried thereby, arms extending laterally from said body element and slide member, rollers supported by some of said arms, a cutting wheel supported by others of said arms, an adjusting screw member journalled by said body member and slide member, a traveler member thereon, and yieldable means operatively connecting said slide member with said traveler member.

2. In a tube cutter, a body element forming a guide, a slide member longitudinally slidable thereon, fixed arms extending laterally from said body element, shiftable arms extending laterally from said slide member, roller and cutting wheel means carried by said arms, an adjusting screw member journalled by said body member and slide member, a traveler member thereon, and yieldable means operatively connecting said slide member with said traveler member.

3. In a tube cutter, a body element, a slide member mounted within said body element, arms extending laterally from said body element, and arms supported by said slide member, said body element being apertured to clear the latter arms, roller and cutting wheel means carried by said arms, an adjusting screw extending longitudinally within said body element and said slide member and journalled thereby, traveler means arranged to engage said adjusting screw, and a yieldable means interposed in the connection between said body element and said slide member through said adjusting screw.

4. In a tube cutter, a body element, a slide member mounted within said body element, arms extending laterally from said body element, and arms supported by said slide member, said body element being apertured to clear the latter arms, roller and cutting wheel means carried by said arms, an adjusting screw extending longitudinally within said body element and said slide member, a traveler member on said adjusting screw, and yieldable means operatively connecting said traveler member with said slide member.

5. In a tube cutter, a body element, a slide member mounted within said body element, arms extending laterally from said body element, and arms supported by said slide member, said body element being apertured to clear the latter arms, roller and cutting wheel means carried by said arms, an adjusting screw extending longitudinally within said body element and said slide member, a traveler member on said adjusting screw, yieldable means operatively connecting said traveler member with said slide member, and means for shifting said traveler member clear of said adjusting screw.

6. In a tube cutter, a body element, a slide member mounted within said body element, arms extending laterally from said body element, and arms supported by said slide member, said body element being apertured to clear the latter arms, roller and cutting wheel means carried by said arms, an adjusting screw extending longitudinally within said body element and said slide member, a traveler including a pair of dog clutch members engageable with said adjusting screw, and yieldable means operatively connecting said traveler with said slide member.

7. In a tube cutter, a body element, a slide member carried thereby, arms extending laterally from said body element and slide member, rollers supported by some of said arms, a cutting wheel supported by others of said arms, an adjusting screw, a traveler including a pair of dog members, means for moving said dog members into engagement with said adjusting screw, means for shifting said dog members clear of said adjusting screw, and yieldable means connecting said traveler with said slide member.

8. In a tube cutter, a body element, a slide member carried thereby, tube cutting and supporting means carried by said body element and slide member, an adjusting screw, a traveler including a pair of dog members, means for moving said dog members into engagement with said adjusting screw, means for shifting said dog members clear of said adjusting screw, and yieldable means connecting said traveler with said slide member.

9. In a tube cutter, a body element, a slide member carried thereby, tube cutting and supporting means carried by said body element and slide member, and means for causing relative movement of said body element and said slide member including, an adjusting screw, a traveler member shiftable into and out of engagement with said adjusting screw, and a yieldable element connecting said adjusting screw with said body element.

10. In a tube cutter, a body element, a slide member carried thereby, fixed laterally extending arms extending from said body element, a pivotal arm extending from said slide member, tube cutting and holding means supported from said arms, an adjusting screw, a traveler carried by said pivotal arm, and shiftable by movement of said pivotal arm into and out of engagement with said adjusting screw, and yieldable means connecting said adjusting screw with said body element.

11. In a tube cutter, a body element, a slide member carried thereby, tube cutting and supporting means carried by said body element and slide member, an adjusting screw, a traveler including a pair of dog members, means for moving said dog members into engagement with said adjusting screw, means for shifting said dog members clear of said adjusting screw, yieldable means connecting said traveler with said slide member, a spring connecting said slide member and body element, said yieldable means tending to shift said tube cutting and supporting means into operative position, said spring tending to shift said tube cutting and supporting means into inoperative position, said spring being weaker than said yieldable means, whereby said yieldable means moves bodily with said slide member until movement of said slide member is restrained.

12. In a tube cutter, a body element, a slide member carried thereby, tube cutting and supporting means carried by said body element and slide member, means for causing relative movement of said body element and said slide member including, an adjusting screw, a traveler member shiftable into and out of engagement with said adjusting screw, a yieldable element tending to shift the portions of said tube cutting and supporting means into operative relation, a spring tending to produce an opposed movement of said portions, said spring being weaker than said yieldable element whereby said yieldable element moves bodily against the action of said spring until said portions are in their operative relation.

13. In a tube cutter, a body element, a slide member carried thereby, tube cutting and supporting means carried by said body element and slide member, means for causing relative movement of said body element and said slide member including, an adjusting screw, a traveler member shiftable into and out of engagement with said adjusting screw, a yieldable element tending to shift the portions of said tube cutting and supporting means into operative relation, a spring tending to produce an opposed movement of said portions, said spring being weaker than said yieldable element whereby said yieldable element moves bodily against the action of said spring until said portions are in their operative relation, and a burr remover carried by said adjusting screw and held against said body element by the tension of said spring, and means tending to retain said burr remover in predetermined operative and inoperative positions relative to said body member.

ROBERT L. MYERS.